United States Patent
Lowe et al.

(10) Patent No.: US 6,475,274 B1
(45) Date of Patent: Nov. 5, 2002

(54) PROCESS FOR MODIFYING PARTICLE SIZE DISTRIBUTION

(75) Inventors: R. Andrew Lowe, Milledgeville; Prakash B. Malla, Dublin; William M. McClarin III, Tennille; Don R. Black, Avera, all of GA (US)

(73) Assignee: Thiele Kaolin Company, Sandersville, GA (US)

( * ) Notice: Subject to any disclaimer, the term of this patent is extended or adjusted under 35 U.S.C. 154(b) by 0 days.

(21) Appl. No.: 09/534,667

(22) Filed: Mar. 24, 2000

(51) Int. Cl.$^7$ .................................................. C09C 1/42
(52) U.S. Cl. ........................ 106/486; 106/416; 106/484
(58) Field of Search ................................ 106/486, 416, 106/484; 209/1

(56) References Cited

U.S. PATENT DOCUMENTS

| | | |
|---|---|---|
| 2,992,936 A | 7/1961 | Rowland |
| 3,085,894 A | 4/1963 | Rowland |
| 4,279,661 A | 7/1981 | Strauch et al. |
| 4,888,315 A * | 12/1989 | Bowman et al. ............ 106/486 |
| 4,943,324 A | 7/1990 | Bundy et al. |
| 4,948,664 A | 8/1990 | Brociner |
| 5,085,707 A | 2/1992 | Bundy et al. |
| 5,168,083 A | 12/1992 | Matthews et al. |
| 5,169,443 A | 12/1992 | Willis et al. |
| 5,411,587 A | 5/1995 | Willis et al. |
| 5,645,635 A | 7/1997 | Behl et al. |
| 5,749,958 A | 5/1998 | Behl et al. |
| 5,840,113 A * | 11/1998 | Freeman et al. ............ 106/486 |
| 5,938,833 A * | 8/1999 | Willis et al. ................ 106/486 |

* cited by examiner

Primary Examiner—Michael Marcheschi
(74) Attorney, Agent, or Firm—Baker, Donelson, Bearman & Caldwell

(57) ABSTRACT

Fine-grained Tertiary kaolin clay pigments providing improved opacity, sheet gloss and print gloss to paper coated with these pigments are produced by removing fine and coarse particles to produce pigments having a narrow particle size distribution.

7 Claims, No Drawings

PROCESS FOR MODIFYING PARTICLE SIZE DISTRIBUTION

TECHNICAL FIELD

This invention relates to a process for modifying particle size distribution. In a more specific aspect, this invention relates to a process for modifying the particle size distribution of fine-grained Tertiary kaolin clays. This invention also relates to the kaolin clay pigments which are produced by this process and to paper products which are filled and/or coated with these pigments.

For ease of reference, this invention will be described with regard to fine-grained Tertiary kaolin clays from the State of Georgia, U.S.A. However, this invention will be understood as applicable to fine-grained Tertiary kaolin clays from other geographical regions.

BACKGROUND OF THE INVENTION

Kaolin is a naturally occurring, relatively fine, white clay which may be generally described as a hydrated aluminum silicate. Kaolin clay, after beneficiation, is widely used as a filler and pigment in various materials, such as rubber and resins, and in various coatings, such as paints and coatings for paper.

The kaolin clays found in the State of Georgia can be generally classified into two types: hard kaolins and soft kaolins. The hard kaolins are fine-grained (usually finer than 80%<2 microns e.s.d.) and typically found in Tertiary age sediments. The soft kaolins are relatively coarse-grained (usually coarser than 65%<2 microns e.s.d.) and typically found in Cretaceous age sediments.

The Cretaceous soft kaolin clays of Georgia contain abundant stacks and books of kaolinite, together with individual platelets of kaolinite. The coarse-grained nature of these clays is due to the recrystallization of kaolinite during weathering and/or diagenesis of the kaolin clay deposit. Tertiary hard kaolin clays of Georgia contain individual kaolinite platelets with a face-to-face association characteristic of a sedimentational fabric.

Kaolin clay filler and coating pigments are conventionally produced by dispersing a kaolin clay in water with the appropriate dispersing agent (such as sodium hexametaphosphate or sodium silicate) and a pH modifier (such as sodium carbonate or sodium hydroxide). After dispersion, the kaolin slurry is degritted using hydroseparators and screens to remove very coarse (>325 mesh) particles which are predominately silica and mica impurities. Following degritting, modification of the particle size distribution is made using centrifugation to remove coarse kaolinite particles. This centrifugation classification is generally used to produce pigments which conform to industry standards for paper coating applications. For example: a No. 1 coating clay has approximately 90%<2 microns e.s.d., and a No. 2 coating clay has approximately 80%<2 microns e.s.d.).

Another particle size modification technique used in the production of kaolin pigments is delamination. The Cretaceous aged coarse-grained kaolin clays contain coarse stacks and books of kaolinite which, when delaminated, cleave upon the basal planes of the kaolinite particle to form very platy particles with a high aspect ratio (aspect ratio=particle length/particle thickness).

After classification, the kaolin slurry can be treated using a reducing agent such as sodium hydrosulfite, an acid such as sulfuric acid and alum such as aluminum sulfate. This reductive leaching process improves the brightness of the pigment by reducing the ferric iron phases to soluble ferrous iron. In some instances, other processing techniques are conducted prior to leaching to produce higher brightness products. These techniques include flotation, selective flocculation and magnetic separation.

Following reduction of the iron, the clay slurry can be dewatered using filtration to remove the soluble iron along with other soluble salts. The dewatered kaolin clay is then redispersed using a dispersing agent such as sodium polyacrylate and a pH modifier such as sodium carbonate. After redispersion, the clay slurry may be spray dried or made into a high-solids slurry (65–72% solids by weight) for shipping.

One characteristic that kaolin clay pigments impart to paper coatings is sheet gloss. The relative fineness and particle shape of the kaolinite particles in the coating pigment control the sheet gloss, with the finer kaolinite forming a smoother and glossier paper surface. Furthermore, during the paper coating process, calendering may be used to further modify sheet gloss by passing the paper through a heated nip and compressing the coating. The advantage of using fine-grained clays over coarser clays is that fine-grained clays do not require a large amount of calendering (pressure or heat) which leads to a weaker sheet, reduced brightness, reduced opacity, slower production rates and overall higher paper processing costs.

The effect of fine kaolinite (i.e., particles<0.2 microns e.s.d.) on the printing characteristics of paper coatings is well known. The variation in the amount of fine kaolinite in paper coating pigments greatly affects the interaction of printing inks with the paper coating. In general, as fines increase, the print gloss of a coated paper decreases due to the effect of the fines on ink adsorption. Similarly, as fines decrease, the print gloss of a coated paper increases. Prior art has shown that the reduction of fines improves print gloss.

Modification of the particle size distribution of kaolin pigments used in paper and filler applications has been shown to alter the opacity of kaolin pigments. In general, a narrow particle size distribution improves the opacity of paper by increasing the light scattering ability of the pigment. Furthermore, delamination of coarse-grained Cretaceous kaolins which contain books and stacks of kaolinite can also modify the light scattering ability of the pigment by modifying particle shape and packing.

Many patents have described the use of kaolin pigments to provide improved sheet gloss, print gloss and opacity in paper coatings. In these patents, particle size modification, specifically by the removal of fine kaolinite (i.e., <0.2 microns e.s.d.), improves the paper coating and printing characteristics.

U.S. Pat. No. 2,992,936 describes a coating clay with improved brightness, gloss and opacity by producing a pigment with a narrow particle size distribution. U.S. Pat. No. 3,085,894 describes the same clay; however, this patent describes blends of the kaolin clay and calcium carbonate.

In general, the particle size distribution providing these improved characteristics in the prior art is as follows:

88–100% by wt. less than 1.7 microns e.s.d.
85–97% by wt. less than 1.5 microns e.s.d.
70–84% by wt. less than 1.0 microns e.s.d.
25–37% by wt. less than 0.5 microns e.s.d.
10–15% by wt. less than 0.3 microns e.s.d.

U.S. Pat. No. 4,279,661 describes grinding and/or classification to produce a mineral filler or coating composition with the particle size distribution having at most 15% less than 0.2 microns e.s.d. and 80–95% less than 1.0 micron e.s.d. This pigment is stated to provide a higher sheet and print gloss over those pigments with particle size distributions outside the claimed distribution.

U.S. Pat. No. 4,943,324 describes a >89 G.E. brightness pigment with a particle size distribution in which at most 15% of the particles are less than 0.3 microns e.s.d. The process uses fines removal (i.e., "defining") and delamination to produce this pigment. Furthermore, the defined and delaminated clay is chemically treated to produce the pigment with improved opacifying properties.

U.S. Pat. No. 4,948,664 describes a coating composition comprising a clay with not more than 5% of the particles less than 0.25 microns e.s.d. and at least 5% of the particles having a particle size not less than 10 microns e.s.d. This patent further discloses that at least 40% of the particles have a particle size not less than 3 microns e.s.d. This composition is disclosed as useful in providing an improved pigment for use in gravure printing.

U.S. Pat. No. 5,085,707 describes paper coating compositions utilizing a defined and delaminated pigment, and these compositions cover a variety of combinations using standard delaminated clay, No. 1 and No. 2 coating clays and the pigment as described in the patent. Both chemically treated and untreated versions of the defined pigment are described. Furthermore, the patent discloses that the defined and delaminated pigment should contain 70% of its particles between 2.0 and 0.3 microns e.s.d. Compositions utilizing this pigment are stated to have increased opacifying and gloss development properties compared to standard kaolin pigments.

U.S. Pat. No. 5,168,083 describes a process for producing a pigment with improved opacifying power which utilizes coarse-grained Cretaceous kaolins. As in many of the previous patents, the pigment contains 5–15%<0.2 microns e.s.d. This patent also states that "scrub grinding" is necessary to produce the pigment, and the patent discloses chemical treatment of the clay.

U.S. Pat. No. 5,169,443 describes an improved delaminated pigment having at most 12%<0.2 microns e.s.d. U.S. Pat. No. 5,411,587 also describes a pigment with this particle size distribution.

U.S. Pat. No. 5,645,635 describes the production of pigments using removal of fines and delamination. The particle size distribution of the product contains less than 5%<0.2 microns e.s.d. U.S. Pat. No. 5,749,958 describes a similar pigment but with a particle size distribution having less than 10%<0.2 microns e.s.d. In both patents, the pigments are stated as having improved opacifying characteristics in paper coatings.

According to the prior art, the particle size modification needed to produce pigments with improved paper coating characteristics has required that the amount of fines (<0.2 microns e.s.d.) be reduced to extremely low levels, generally less than 15%. Furthermore, many of the prior art pigments require delamination or grinding to produce a pigment with improved paper coating properties. Finally, the clay material generally used in the prior art is a coarse-grained kaolin containing stacks and books of kaolinite which respond to a delamination process.

Due to the limitations of the prior art processes, there is a need in the industry for a process to modify the particle size distribution of fine-grained Tertiary kaolin clays without lowering the amount of kaolinite fines to prior art levels and without the need for a delamination process step.

SUMMARY OF THE INVENTION

Briefly described, the present invention provides for modifying the particle size distribution of a fine-grained Tertiary kaolin clay by a process which "tailors" the kaolin clay by removing fine particles and coarse particles.

As used in this application, the term "tailors" or "tailored" refers to the process steps which remove fine particles and coarse particles from the kaolin clay to produce a pigment having a narrow particle size distribution.

In addition, as used in this application, and as measured by a Micromeritics SediGraph instrument, the term "fine particles" refers to particles having an equivalent spherical diameter (e.s.d.) less than 0.2 microns, and the term "coarse particles" refers to particles having an e.s.d. greater than 2.0 microns.

This invention relates to the modification of the particle size distribution of a fine-grained Tertiary kaolin clay to improve the characteristics of a paper coated with this modified clay. The particle size modification involves the removal of coarse and fine kaolinite particles to produce a tailored clay pigment with a narrow particle size distribution.

The tailored pigments of the present invention exhibit improved paper coating characteristics (i.e., sheet gloss, print gloss and opacity) over standard kaolin pigments. Furthermore, these tailored pigments are superior to other tailored clay pigments in that improvements in paper coating characteristics are gained without substantially reducing the amount of fine kaolinite particles as required when producing tailored pigments using coarse-grained Cretaceous kaolins.

Accordingly, an object of this invention is to provide a process for modifying particle size distribution.

Another object of this invention is to provide a process for modifying the particle size distribution of fine-grained Tertiary kaolin clays.

Another object of this invention is to provide a process for modifying the particle size distribution of fine-grained Tertiary kaolin clays by tailoring the clays to remove fine particles and coarse particles.

Another object of this invention is to provide a process for tailoring fine-grained Tertiary kaolin clays by removing fine particles and coarse particles to produce a kaolin clay pigment with a narrow particle size distribution.

Another object of this invention is to provide a tailored kaolin clay pigment having a narrow particle size distribution.

Still another object of this invention is to provide a tailored fine-grained Tertiary kaolin clay pigment.

Still another object of this invention is to provide a tailored fine-grained Tertiary kaolin clay pigment which will provide improved opacity, sheet gloss and print gloss to a paper coated with this pigment.

Still another object of this invention is to provide a paper sheet coated with a tailored kaolin clay pigment having a narrow particle size distribution.

Still another object of this invention is to provide a paper sheet coated with a tailored fine-grained Tertiary kaolin clay and having improved opacity, sheet gloss and print gloss.

These and other objects, features and advantages of this invention will become apparent from the following detailed description.

DETAILED DESCRIPTION OF THE INVENTION

The present invention relates to a process for modifying the particle size distribution of a fine-grained Tertiary kaolin clay, wherein the process comprises the sequential steps of (A) obtaining a starting material which is an aqueous slurry of a dispersed and degritted fine-grained Tertiary kaolin clay and then (B) tailoring the slurry by removing fine particles and coarse particles. The tailored pigment of this invention has a particle size distribution of 90–100 percent by weight less than 2.0 microns e.s.d. and at least 15 percent by weight less than 0.2 microns e.s.d.

A paper sheet, when coated or filled with the tailored kaolin clay pigment of this invention, has improved opacity, sheet gloss and print gloss when compared to a paper sheet coated or filled with a kaolin clay pigment which has not been tailored according to the present invention. By providing these improved properties, the tailored pigment of this invention is especially useful as a filler and coating for paper.

In the pigments described in many of the prior art patents, the amount of fine kaolinite particles has been substantially decreased to improve paper coating properties (i.e., sheet gloss, print gloss and opacity). In these prior art patents, the amount of fines is reduced to very low levels, generally less than 15%<0.2 microns e.s.d. Furthermore, these patents utilize coarse-grained kaolins that contain stacks and books of kaolinite. Also, these clays are amenable to grinding and/or delamination. As previously described, the delamination process alters the particle shape of the kaolinite particles and produces a more platy kaolinite. This is platy particle form alters the particle packing and particle orientation in the paper coating, thereby changing the paper coating characteristics.

Contrary to the prior art, the pigment of this invention is produced from fine-grained Tertiary kaolins which do not contain stacks and books of kaolinite.

The particles in these clays have a natural platy characteristic and, therefore, do not require delamination to alter the particle shape. We have unexpectedly found that fine-grained Tertiary kaolin clays can be tailored, without delamination, to produce a pigment which provides coated sheets with equivalent or improved print gloss, sheet gloss and opacity, as compared to a similar sheet coated with either a coarse-grained kaolin clay pigment or a non-tailored fine-grained Tertiary kaolin clay. The tailoring process of this invention produces a pigment having a modified particle size distribution which is achieved by removing less fine particles than taught in the prior art. The pigments of this invention exhibit superior light scattering ability (i.e., opacity) without the substantial reduction of fine particles as taught by the prior art.

The tailoring process of this invention allows us to use fine-grained Tertiary kaolin clays having a high fines content and produce, without delamination or excessive removal of fines as taught by the prior art, an equivalent or improved pigment for use as fillers and coatings for paper.

The pigments of this invention have the following particle size distribution:

90–100% by wt. less than 2.0 microns e.s.d.
80–100% by wt. less than 1.0 microns e.s.d.
55–90% by wt. less than 0.5 microns e.s.d.
30–60% by wt. less than 0.3 microns e.s.d.
15–35% by wt. less than 0.2 microns e.s.d.

Preferably, the pigments of this invention have the following particle size distribution:

95–100% by wt. less than 2.0 microns e.s.d.
85–100% by wt. less than 1.0 microns e.s.d.
65–90% by wt. less than 0.5 microns e.s.d.
30–50% by wt. less than 0.3 microns e.s.d.
15–25% by wt. less than 0.2 microns e.s.d.

The tailored pigment of this invention is improved over prior art pigments in that sheet gloss, print gloss and opacity are equivalent or improved without the excessive reduction of fine particles or the need for delamination.

The starting material for this invention is a fine-grained Tertiary kaolin clay which has been dispersed using conventional processing techniques, degritted to remove coarse (less than 325 mesh) sand and mica impurities and then slurried with water. The process of this invention is exemplified by tailoring the starting material to remove fine particles and coarse particles. The product is subjected to particle size fractionation to produce a No. 1 coating clay (i.e., greater than 90 percent less than 2.0 microns e.s.d.).

The tailoring step of this invention is accomplished by particle size fractionation, a conventional step in the processing of many kaolin clays. In the present invention, particle size fractionation removes fine and coarse particles to produce a tailored kaolin clay pigment having a narrow particle size distribution.

The following test methods are used to characterize the coated sheet, opacity and print qualities of the paper.

Light Scattering Ability

The light scattering ability of a paper coating can be estimated by determining the scattering coefficient (S) as described in TAPPI, 1978, Vol. 61, No. 6, pages 78–80. The light scattering ability of a pigment used in a paper coating directly effects the opacity of the paper. The higher the light scattering ability of the pigment, the more opaque the paper will be when coated with the pigment. Therefore, a pigment with a higher scattering coefficient indicates that the pigment will produce a higher opacity coated paper.

Opacity

Paper opacity is a measure of paper translucence. In most paper coating applications where the paper is printed, the objective is to have a high opacity paper (i.e., a paper that is essentially opaque). Paper opacity can be controlled by varying the paper coating thickness (i.e., varying coat weight) or by varying the scattering coefficient of the pigment used in the paper coating. To produce a higher opacity, a heavier coating weight can be used or a pigment with a higher scattering coefficient can be used. However, when applying a lightweight coating (LWC), increasing the scattering coefficient is the primary way of increasing paper opacity. The TAPPI method used to measure the opacity of coated paper is T 519om-96.

Sheet Gloss and Print Gloss

Sheet gloss and print gloss are important characteristics in the production of high quality paper coatings. Sheet gloss is a measure of the surface quality of coated paper, in particular the "shiny" appearance of the paper. The method used to measure the sheet gloss is TAPPI method T 480 om-92. This method measures the specular gloss of the paper at 75°. This same method can be used to measure the print gloss by measuring the spectral gloss of an ink film on coated paper. A higher print gloss is desired so that the printed images will stand out on the paper.

The present invention is further illustrated by the following examples which are illustrative of certain embodiments designed to teach those of ordinary skill in the art how to practice this invention and to represent the best mode contemplated for carrying out this invention.

EXAMPLE 1

The tailored pigments of Example 1 are prepared using the following process.

The tailored pigments are prepared by dispersing the appropriate kaolin (i.e. fine-grained Tertiary or coarse-grained Cretaceous kaolin) in water using sodium silicate as the dispersant and sodium hydroxide as the pH modifier. The kaolin slurries are then classified using centrifuigation to remove coarse particles (greater than 2.0 microns) and produce a No. 1 coating clay (at least 90%<2.0 microns). In some instances, the coarse-grained Cretaceous kaolins are delaminated after classification to a No. 1 coating clay using glass bead delamination practices commonly used in the industry. After classification to a No. 1 coating clay, the kaolin slurries are classified using centrifugation to remove fine particles (less than 0.2 microns). The tailored kaolin slurries are then leached using sodium dithionite, alum and sulfuric acid. The leached clays are then filtered to remove water and soluble salts, redispersed with sodium polyacrylate as the dispersant and soda ash as the pH modifier, and then spray dried. The tailored pigments are then used in the paper coatings described below.

Table 1 shows the particle size distribution of the tailored pigments produced using fine-grained Tertiary clays and coarse-grained Cretaceous clays. Also shown is the particle size distribution of a standard Tertiary clay pigment. Furthermore, the pigments that are delaminated are indicated. Finally, also shown in Table 1 are the sheet gloss and print gloss for No. 1 enamel coated sheets produced using the various pigments.

Standard No. 1 coating colors containing 100 parts pigment, 4.12 parts Penford 290 starch, 12.38 parts Dow 620 latex, 0.165 parts Sunrez 700M crosslinking agent and 1 part Nopcote C-104 lubricant are prepared and applied to 62 lb raw stock at approximately 8.6 lbs/3300 ft$^2$. All No. 1 enamel coatings are applied using a cylindrical laboratory coater. Following coating, sheets are supercalendered (151 PLI, 125° F., 2 nips/side) prior to final examination.

TABLE 1

| Pigment | Particle Size (percent less than in e.s.d.) | | | | | Sheet Gloss | Print Gloss |
|---|---|---|---|---|---|---|---|
| | 2 um | 1 um | 0.5 um | 0.25 um | 0.20 um | | |
| Standard Tertiary Clay | 98 | 95 | 86 | 59 | 48 | 71 | 92 |
| Tailored Tertiary Clay | 96 | 87 | 62 | 29 | 23 | 73 | 95 |
| Tailored Tertiary Clay | 97 | 92 | 68 | 31 | 24 | 74 | 93 |
| Tailored Tertiary Clay | 97 | 84 | 57 | 30 | 23 | 74 | 94 |
| Tailored Cretaceous Clay - Delaminated | 93 | 69 | 33 | 16 | 14 | 70 | 95 |

As Table 1 shows, the tailored Tertiary clay pigments have equivalent or improved print gloss as compared to the tailored and delaminated Cretaceous pigment and the standard Tertiary clay pigment. This is accomplished without having to reduce the fines to the low levels (less than 15%<0.2 microns e.s.d.) of the tailored and delaminated Cretaceous clay pigment. Also, improvements in sheet gloss can be attained with fine-grained Tertiary kaolin clay pigments over the standard Tertiary pigment and the tailored and delaminated Cretaceous pigment. The results shown in Table 1 for the tailored Tertiary clays are achieved without delamination.

EXAMPLE 2

The tailored pigments of Example 2 are prepared according to Example 1.

Table 2 shows the particle size distribution of the tailored pigments produced using fine-grained Tertiary clays and coarse-grained Cretaceous clays. Also shown is the particle size distribution of a standard Tertiary clay pigment. Furthermore, the pigments that are delaminated are indicated. Finally, also shown in Table 3 are the sheet gloss and print gloss for No. 1 enamel coated sheets produced using the various pigments.

Standard No. 1 coating colors containing 100 parts pigment, 4 parts Penford 290 starch, 12 parts Dow 620 latex, 0.160 parts Sunrez 700M crosslinking agent and 1 part Nopcote C-104 lubricant are prepared and applied to 62 lb raw stock at approximately 8.4 lbs/3300 ft$^2$. All No. 1 enamel coatings are applied using a cylindrical laboratory coater. Following coating, sheets are supercalendered (336 PLI, 125'F, 2 nips/side) prior to final examination.

TABLE 2

| Pigment | Particle Size (percent less than in e.s.d.) | | | | | Sheet Gloss | Print Gloss |
|---|---|---|---|---|---|---|---|
| | 2 um | 1 um | 0.5 um | 0.25 um | 0.20 um | | |
| Standard Tertiary Clay | 98 | 95 | 86 | 59 | 48 | 72 | 86 |
| Tailored Tertiary Clay | 99 | 98 | 86 | 36 | 22 | 74 | 95 |
| Tailored Tertiary Clay | 95 | 86 | 67 | 29 | 21 | 71 | 93 |
| Tailored Cretaceous Clay - Delaminated | 95 | 79 | 46 | 17 | 13 | 68 | 92 |

As Table 2 shows, the tailored Tertiary clay pigments have improved print gloss as compared to the standard Tertiary and the tailored and delaminated Cretaceous pigment. Again, this is accomplished without having to reduce the fines to the low levels (less than 15%<0.2 microns e.s.d.) of the tailored and delaminated Cretaceous clay pigment. Also, improvements in sheet gloss can be attained with fine-grained Tertiary kaolin clay pigments over the standard Tertiary pigment and the tailored and delaminated Cretaceous pigment. The results shown in Table 2 for the tailored Tertiary clays are achieved without delamination.

EXAMPLE 3

The tailored pigments of Example 3 are prepared according to Example 1.

Table 3 shows the particle size distribution of the tailored pigments produced using fine-grained Tertiary clays and coarse-grained Cretaceous clays.

Also shown is the particle size distributions of standard Tertiary and Cretaceous clay pigments. Furthermore, the pigments that are delaminated are indicated.

Included in Table 3 are the scattering coefficients for each pigment. As stated previously, narrowing the particle size distribution increases the light scattering ability and, therefore, the scattering coefficient of the pigment. As previously stated, this improved light scattering ability improves the opacifying characteristics of the pigment when used in paper coatings.

TABLE 3

| Pigment | Particle Size (percent less than in e.s.d.) | | | | | Scattering Coefficient (at 457 nm) |
|---|---|---|---|---|---|---|
| | 2 um | 1 um | 0.5 um | 0.25 um | 0.20 um | |
| Fine-grained Tertiary Clay Pigments | | | | | | |
| Standard Tertiary Clay | 98 | 95 | 86 | 59 | 48 | 0.41 |
| Tailored Tertiary Clay | 97 | 92 | 68 | 31 | 24 | 0.56 |
| Tailored Tertiary Clay | 96 | 87 | 62 | 29 | 23 | 0.50 |
| Coarse-grained Cretaceous Clay Pigments | | | | | | |
| Standard Cretaceous Clay | 90 | 78 | 58 | 33 | 28 | 0.40 |
| Tailored Cretaceous Clay | 94 | 78 | 53 | 27 | 25 | 0.45 |
| Tailored Cretaceous Clay | 95 | 76 | 42 | 17 | 13 | 0.46 |
| Tailored Cretaceous Clay - Delaminated | 97 | 84 | 59 | 28 | 23 | 0.45 |
| Tailored Cretaceous Clay - Delaminated | 95 | 79 | 46 | 17 | 13 | 0.47 |

Table 3 shows the improvement in scattering coefficient after tailoring the Tertiary and Cretaceous clays. Table 3 reveals that the tailored Tertiary pigments have greatly improved light scattering ability over the Cretaceous tailored pigments as indicated by the higher scattering coefficients. Again, this higher scattering coefficient is attained without having to reduce the fines to the level of the Cretaceous pigments (less than 15%<0.2 microns e.s.d.). The results shown in Table 3 for the tailored Tertiary clays are achieved without delamination.

EXAMPLE 4

The tailored pigments of Example 4 are prepared according to Example 1.

Table 4 shows the particle size distribution of tailored kaolin clay pigments produced using fine-grained Tertiary clays and coarse-grained Cretaceous clays. Also shown is the particle size distribution of a standard Tertiary clay pigment. Furthermore, the pigments that are delaminated are indicated. Finally, also shown in Table 4 are the sheet gloss and print gloss for No. 1 enamel coated sheets produced using the various pigments.

Standard No. 1 coating colors containing 100 parts pigment, 4.12 parts Penford 290 starch (available from Penford Products Co., Cedar Rapids, Iowa), 12.38 parts Dow 620 styrene butadiene rubber latex (available from Dow Chemical Co., Midland, Mich.), 0.165 parts Sunrez 700M crosslinking agent (available from Ben Corp, Inc., Chester, S.C.) and 1 part Nopcote C-104 lubricant (available from Geo Specialty Chemicals, Inc., Cedartown, Ga.) are prepared and applied to 62 lb raw stock at approximately 7.6 lbs/3300 ft². All No. 1 enamel coatings are applied using a cylindrical laboratory coater. Following coating, sheets are supercalendered (214 PLI, 125° F., 2 nips/side) prior to final examination.

TABLE 4

| Pigment | Particle Size (percent less than in e.s.d.) | | | | | Sheet Gloss | Print Gloss |
|---|---|---|---|---|---|---|---|
| | 2 um | 1 um | 0.5 um | 0.25 um | 0.20 um | | |
| Standard Tertiary Clay | 98 | 96 | 86 | 57 | 48 | 75 | 91 |
| Tailored Tertiary Clay | 96 | 88 | 73 | 34 | 23 | 76 | 95 |
| Tailored Tertiary Clay | 98 | 88 | 67 | 31 | 22 | 75 | 94 |
| Tailored Tertiary Clay | 91 | 82 | 67 | 30 | 18 | 74 | 96 |
| Tailored Cretaceous Clay - Delaminated | 94 | 74 | 41 | 18 | 14 | 74 | 98 |

As Table 4 shows, the fine-grained Tertiary tailored clay pigments exhibit improved print gloss over the standard Tertiary clay pigment. The print gloss of the tailored Tertiary pigments approaches that of the Cretaceous tailored and delaminated pigment. Also, the tailored fine-grained Tertiary pigments have equivalent or improved sheet gloss over the standard Tertiary clay pigment and the Cretaceous tailored and delaminated pigment. The results shown in Table 4 for the tailored Tertiary clays are achieved without delamination.

EXAMPLE 5

The tailored pigments of Example 5 are prepared according to Example 1.

Table 5 shows the particle size distributions of tailored pigments produced using fine-grained Tertiary clays and coarse-grained Cretaceous clays, Also shown in Table 5 are the opacity values for lightweight coated sheets produced using the various pigments.

Standard lightweight coating colors containing 100 parts pigment, 8.5 parts Penford 280 starch (available from Penford Products Co., Cedar Rapids, Iowa), 8.5 parts SNAP 2042 styrene butadiene rubber latex (available from Reichhold Chemicals Inc., Research Triangle Park, N.C.), 0.34 parts Sunrez 700M crosslinking agent and 1 part Nopcote C-104 lubricant are prepared and applied to 27 lb raw stock at approximately 5.0 lbs/3300 ft². All the lightweight coatings are applied using a cylindrical laboratory coater. Following coating, sheets are supercalendered to an equal sheet gloss of approximately 58. The tailored Tertiary clays require 99 PLI, 125° F., 2 nips/side and 170 PLI, 125° F., 2 nips/side respectively. The tailored Cretaceous clay require 205 PLI, 125° F., 2 nips/side to attain a 58 gloss.

TABLE 5

| Pigment | Particle Size (percent less than in e.s.d.) | | | | | Sheet Gloss | Sheet Opacity |
|---|---|---|---|---|---|---|---|
| | 2 um | 1 um | 0.5 um | 0.25 um | 0.20 um | | |
| Tailored Tertiary Clay | 99 | 98 | 86 | 36 | 22 | 58 | 84.2 |
| Tailored Tertiary Clay | 95 | 86 | 67 | 29 | 21 | 59 | 83.5 |
| Tailored Cretaceous Clay - Delaminated | 95 | 79 | 46 | 17 | 13 | 57 | 83.5 |

As Table 5 shows, the tailored Tertiary clays obtain an opacity equivalent to or improved as compared to the tailored and delaminated coarse-grained Cretaceous clay. This is accomplished without the dramatic reduction in fines required by the Cretaceous tailored clay. Also, the tailored Tertiary clays are able to attain a gloss of approximately 58 using much lower calendaring pressure than used for tailored coarse-grained Cretaceous clays. As previously stated, using a lower calendering pressure leads to lower processing costs and a stronger sheet. The results shown in Table 5 for the tailored Tertiary clays are achieved without delamination.

This invention has been described in detail with particular reference to certain embodiments, but variations and modifications can be made without departing from the spirit and scope of the invention as defined in the following claims.

What is claimed is:

1. A process for modifying the particle size distribution of a fine-grained Tertiary kaolin clay, wherein the process comprises the sequential steps of:
    A. obtaining a starting material comprising an aqueous slurry of a dispersed and degritted fine-grained Tertiary kaolin clay; and
    B. tailoring the slurry by removing (a) a portion of particles having an e.s.d. less than 0.2 microns and (b) particles having an e.s.d. greater than 2.0 microns, thereby producing a pigment having a particle size distribution of 90–100 percent by weight less than 2.0 microns e.s.d. and at least 15 percent by weight less than 0.2 microns e.s.d.

2. A process as defined by claim 1 wherein the step of removing particles is by particle size fractionation.

3. A process as defined by claim 1 wherein the step of removing particles is by centrifugation.

4. A process as defined in claim 1 wherein the pigment has a particle size distribution of:
    90–100 percent by weight less than 2.0 microns e.s.d
    80–100 percent by weight less than 1.0 microns e.s.d.
    55–90 percent by weight less than 0.5 microns e.s.d.
    30–60 percent by weight less than 0.3 microns e.s.d.
    15–35 percent by weight less than 0.2 microns e.s.d.

5. A process as defined in claim 1 wherein the pigment has a particle size distribution of:
    95–100 percent by weight less than 2.0 microns e.s.d
    85–100 percent by weight less than 1.0 microns e.s.d.
    65–90 percent by weight less than 0.5 microns e.s.d.
    30–50 percent by weight less than 0.3 microns e.s.d.
    15–25 percent by weight less than 0.2 microns e.s.d.

6. A tailored pigment comprising a fine-grained Tertiary kaolin clay and having a particle size distribution of:
    90–100 percent by weight less than 2.0 microns e.s.d
    80–100 percent by weight less than 1.0 microns e.s.d.
    55–90 percent by weight less than 0.5 microns e.s.d.
    30–60 percent by weight less than 0.3 microns e.s.d.
    15–35 percent by weight less than 0.2 microns e.s.d.

7. A tailored pigment comprising a fine-grained Tertiary kaolin clay and having a particle size distribution of:
    95–100 percent by weight less than 2.0 microns e.s.d
    85–100 percent by weight less than 1.0 microns e.s.d.
    65–90 percent by weight less than 0.5 microns e.s.d.
    30–50 percent by weight less than 0.3 microns e.s.d.
    15–25 percent by weight less than 0.2 microns e.s.d.

* * * * *